(12) United States Patent
Taylor

(10) Patent No.: US 10,217,240 B2
(45) Date of Patent: Feb. 26, 2019

(54) METHOD AND SYSTEM TO DETERMINE DISTANCE TO AN OBJECT IN AN IMAGE

(71) Applicant: Wheego Electric Cars, Inc., Atlanta, GA (US)

(72) Inventor: Thomas Steven Taylor, Atlanta, GA (US)

(73) Assignee: AUTONOMOUS FUSION, INC., Atlanta, GA (US)

( * ) Notice: Subject to any disclaimer, the term of this patent is extended or adjusted under 35 U.S.C. 154(b) by 161 days.

(21) Appl. No.: 15/412,967

(22) Filed: Jan. 23, 2017

(65) Prior Publication Data

US 2018/0211410 A1 Jul. 26, 2018

(51) Int. Cl.
| | |
|---|---|
| *G06K 9/46* | (2006.01) |
| *G06T 7/00* | (2017.01) |
| *G06T 7/73* | (2017.01) |
| *H04N 7/18* | (2006.01) |
| *G06T 7/246* | (2017.01) |
| *G06T 7/80* | (2017.01) |
| *G06K 9/00* | (2006.01) |
| *G06K 9/62* | (2006.01) |

(Continued)

(52) U.S. Cl.
CPC ............ *G06T 7/74* (2017.01); *G06K 9/00201* (2013.01); *G06K 9/00818* (2013.01); *G06K 9/4604* (2013.01); *G06K 9/6204* (2013.01); *G06T 7/248* (2017.01); *G06T 7/80* (2017.01); *H04N 7/183* (2013.01); *B60R 11/04* (2013.01); *G06K 9/22* (2013.01); *G06T 2207/30252* (2013.01); *H04M 2250/52* (2013.01)

(58) Field of Classification Search
CPC .......... G06K 9/00805; G06K 9/00362; G06K 2209/23; G06K 9/00369; G06K 9/00798; G06K 9/00825; G06K 2009/363; G06K 9/00785; G06K 9/00791; G06K 9/00818; G06K 9/209; G06K 9/36; G06K 9/4604; G01S 13/08; G01S 13/867; G01S 13/93
See application file for complete search history.

(56) References Cited

U.S. PATENT DOCUMENTS

| | | | |
|---|---|---|---|
| 9,870,708 B2* | 1/2018 | Chandran | ................. G06T 7/50 |
| 2002/0134151 A1* | 9/2002 | Naruoka | ................. G01S 11/12 |
| | | | 73/291 |

(Continued)

*Primary Examiner* — Nathnael Aynalem
(74) *Attorney, Agent, or Firm* — Doughty Law, L.L.C.; John L. Doughty

(57) ABSTRACT

A controller/application analyzes image data from a camera to determine the distance to an object in an image based on the size of the object in the image and based on a known focal length of a camera that captured the image and based on a known dimension of the actual object. The known dimension of the object may be retrieved from a database that is indexed according to outline shape, color, markings, contour, or other similar features or characteristics. The distance determined from analysis of the image and objects therein may be used to calibrate, or to verify the calibration of, complex distance determining systems that may include LIDAR. Object distance determinations in different image frames, whether to the same or different object, taken a known time apart may be used to determine speed of the camera that took the images, or speed of a vehicle associated with camera.

20 Claims, 5 Drawing Sheets

(51) Int. Cl.
  *B60R 11/04*     (2006.01)
  *G06K 9/22*      (2006.01)

(56) References Cited

U.S. PATENT DOCUMENTS

| | | | |
|---|---|---|---|
| 2003/0030546 A1* | 2/2003 | Tseng | B60R 1/00 |
| | | | 340/425.5 |
| 2009/0088978 A1* | 4/2009 | Ishikawa | G01C 21/26 |
| | | | 701/514 |
| 2009/0240432 A1* | 9/2009 | Osanai | G08G 1/165 |
| | | | 701/300 |
| 2015/0323310 A1* | 11/2015 | Coon | G06K 9/0061 |
| | | | 348/135 |
| 2018/0165822 A1* | 6/2018 | Uliyar | G06T 7/55 |

\* cited by examiner

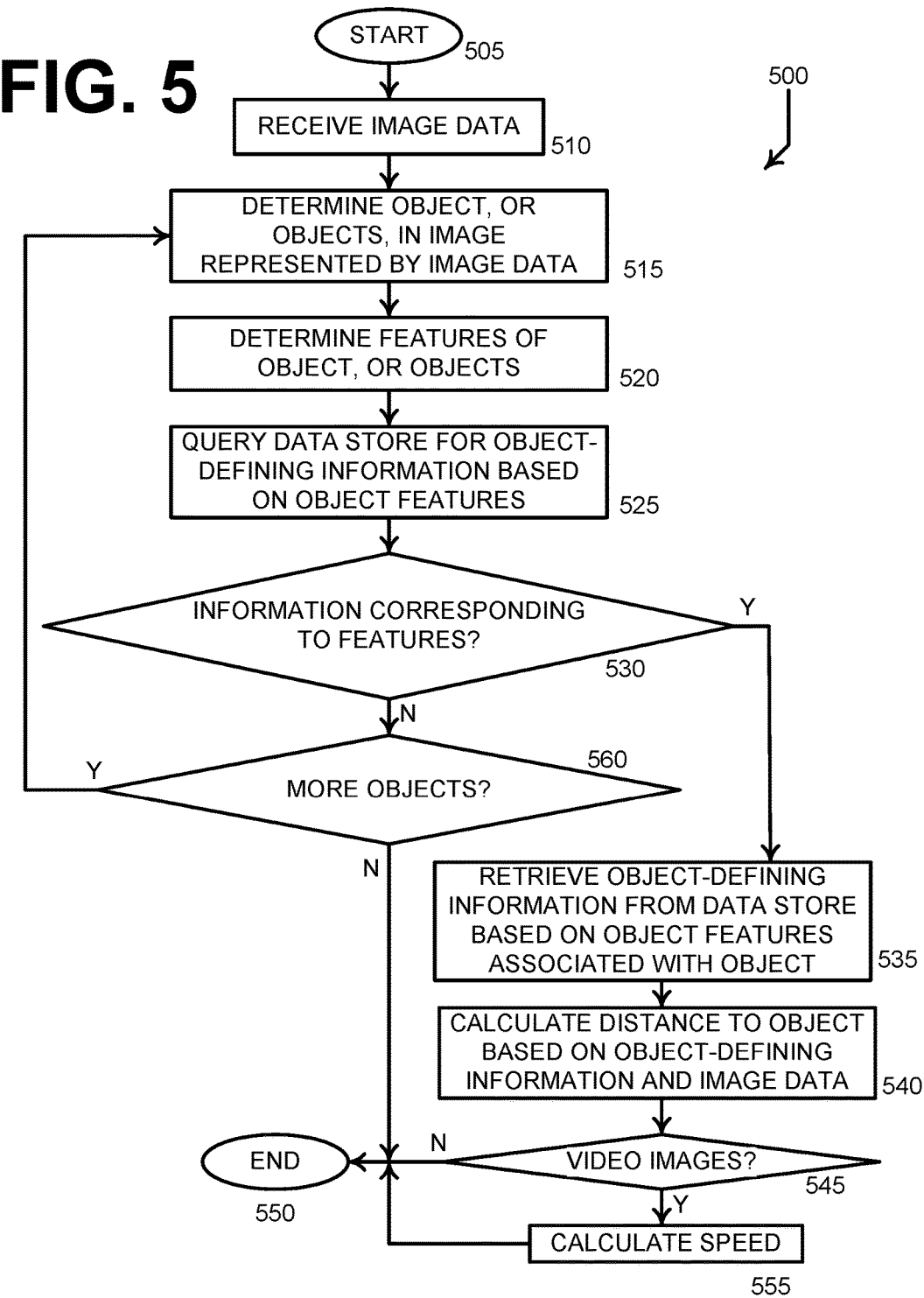

METHOD AND SYSTEM TO DETERMINE DISTANCE TO AN OBJECT IN AN IMAGE

FIELD

Aspects disclosed herein relate to computer vision and analysis of objects in an image.

SUMMARY

A processor of a computer device receives image data representing an image of a scene captured with a camera. A processor processes the image data to determine one or more objects in the scene captured by the camera. A processor determines from the image data one or more object features associated with a first object of the one or more objects. A processor retrieves, which may include querying and in response to a query receiving, object-defining information from a data store based on the one or more object features associated with the first object. A processor calculates the distance from the camera that captured the scene to the first object in the scene based on the object-defining information. These steps may be performed by the same processor. Alternatively, processing of these steps may be distributed among multiple processors, that may be proximate (proximate with respect to location, proximate with respect to logical network locations such as may exist when devices are communicatively coupled via a short range wireless link such as a Wi-Fi link or a Bluetooth link within a vehicle), or that may be remote from each other either location-wise, communication-network-wise, or both.

The one or more features associated with the first object may be an outline shape of the first object. The retrieved object-defining information stored in the data store information associated with the first object may be a dimension associated with the first object. Calculating the distance from the camera that captured the scene to the first object in the scene based on the object-defining information may include: determining a number of pixels in the image that correspond to the dimension associated with the first image, calculating based on the number of pixels, a known focal length of the camera, and the retrieved dimension, the distance to the object from the camera that captured the image.

The processor of the computer device may capture a second image of the scene, wherein the camera is associated with a moving vehicle, and wherein the scene is a scene of a roadway and the environment surrounding the roadway upon which the vehicle is traveling, and wherein the second image is captured in a frame a predetermined time from a first frame that corresponds to a time that the first image was captured. The camera may calculate a distance from the camera to the first object in the second image and may determine a speed of the vehicle based on a change of distance between the camera to the first object in the first image and distance between the camera to the first object in the second image and the time between the capturing of the first image and the capturing of the second image.

The processor may calibrate a complex vision system by using calculated distance to objects based on image data from a camera that captured a scene that includes the first object and based on object-defining information associated with the first object. The camera that captures the image data used to calibrate the complex vision system may be part of the complex computer vision system that include a LIDAR system.

The processor may calculate a distance to a second object in the first image based on a calculated distance to the first object, wherein both first and second objects have known dimensions. The first object and the second object may be similar objects, and may have similar shape, size, color, font, image, message encoding portion, or text. For example, the first object and the second object may both be road signs. Objects proximate the first object in the first image are analyzed to provide clues that a second object is proximate the first object, wherein object-defining information is not associated with the second image in the data store.

BRIEF DESCRIPTION OF THE DRAWINGS

FIG. 5 illustrates a flow diagram of a method for determining the distance of an object from a camera that took the image.

DETAILED DESCRIPTION

As a preliminary matter, it will be readily understood by those persons skilled in the art that the present invention is susceptible of broad utility and application. Many methods, aspects, embodiments, and adaptations of the present invention other than those herein described, as well as many variations, modifications, and equivalent arrangements, will be apparent from, or reasonably suggested by, the substance or scope of the described aspects.

Accordingly, while the present invention has been described herein in detail in relation to preferred embodiments and aspects, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
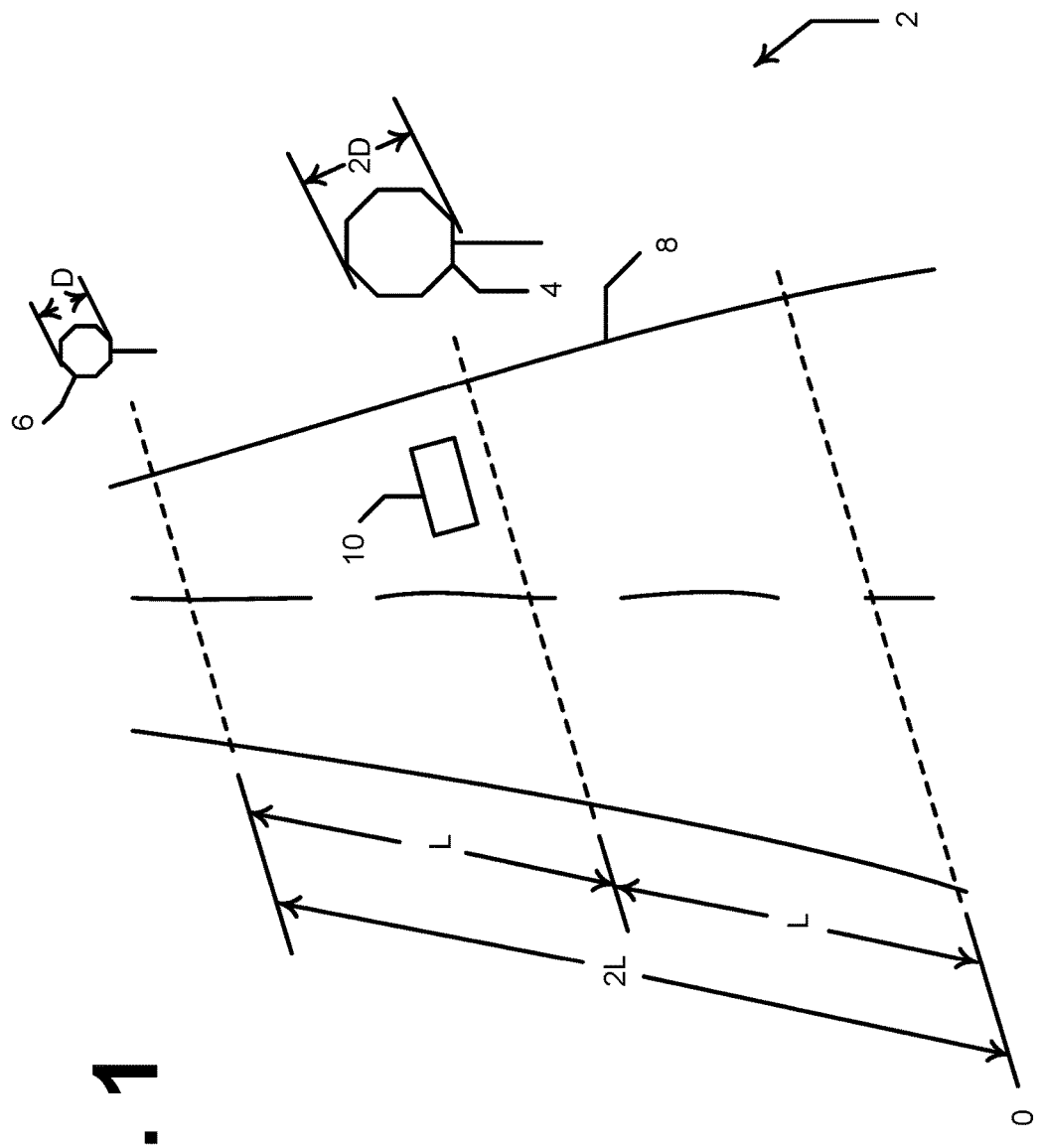
FIG. 1 illustrates a scene of a roadway as viewed from the perspective of a vehicle traveling on the roadway.

Turning now to FIG. 1, the figure illustrates a scene 2. Scene 2 shows a first object 4 and a second object 6 proximate a roadway 8 as viewed from the perspective of a vehicle traveling along the roadway. Scene 2 may be captured by a camera associated with the vehicle. For example, the manufacturer of the vehicle may have installed the camera into, or onto, the vehicle during manufacture of the vehicle. The camera may be fixed to the vehicle either permanently or removably. The camera may be included as part of a user device, such as a smart phone, tablet, or a camera such as a single lens reflex camera that include a sensor for converting light impinging upon it into digital signals, such as a complementary metal-oxide semiconductor ("CMOS") sensor, a charge-coupled device ("CCD") sensor, or the like. In scene 2, first object 4 is located a distance L from the camera and second object 6 is twice as far from the camera, or 2 L from the camera. From the perspective of a camera capturing scene 2, or a person observing scene 2, the longest dimension, or distance, between two opposing vertices of first object 4 appears to be twice as much as the longest dimension between two opposing vertices of second object 6, as shown by dimensions 2D and D, which correspond to the first object and the second object, respectively. Object 10 lies in roadway 8 in the travel lane of the vehicle (assuming right hand driving) proximate first object 4.

Figure 2:
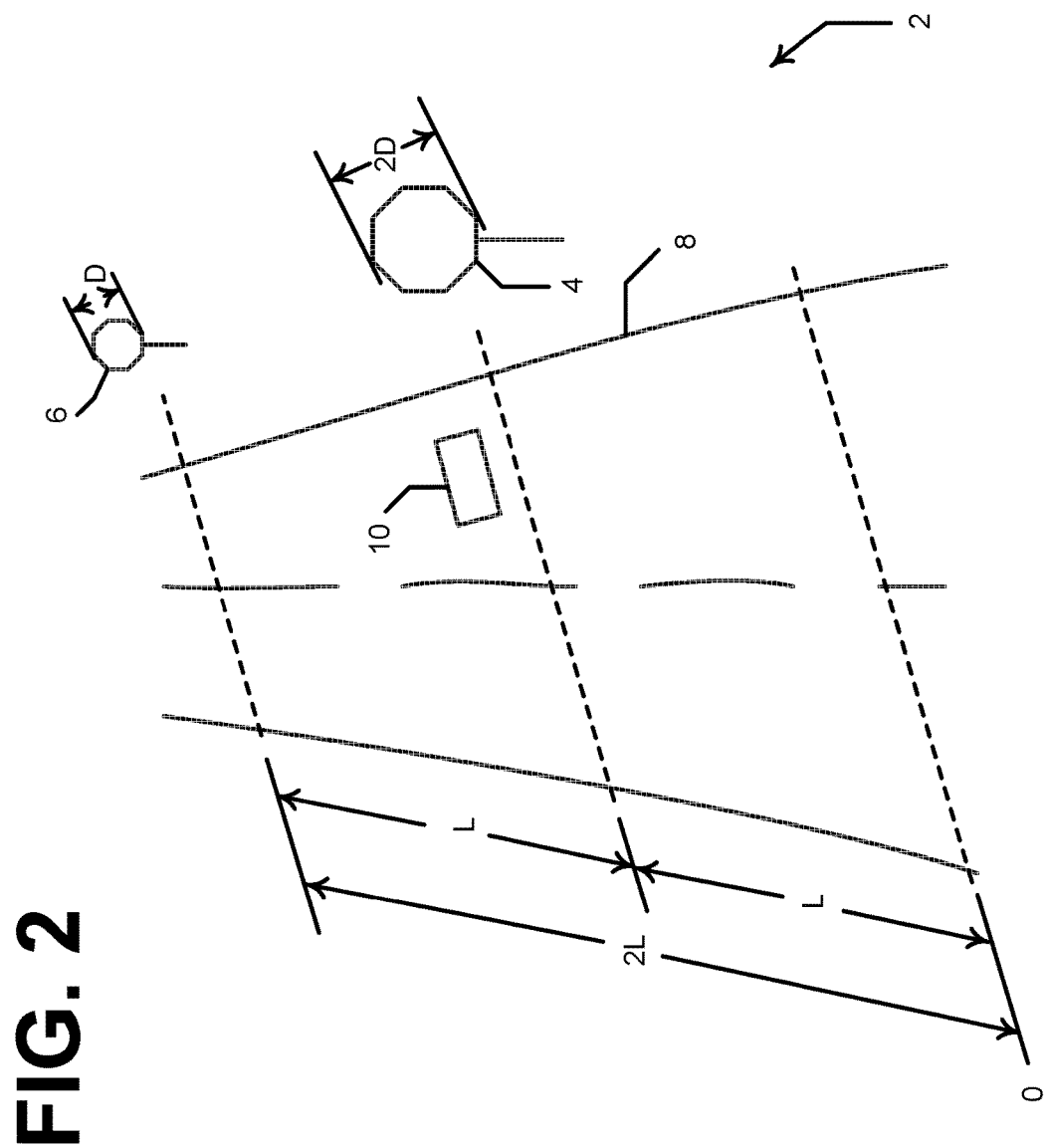
FIG. 2 illustrates a digitized image of a scene of a roadway as viewed from the perspective of a camera associated with a vehicle traveling on a roadway that took the image.

Turning now to FIG. 2, the figure illustrates a grid placed over the features of scene 2 of FIG. 1, such that the outlines of objects 4, 6, and 10, and roadway 8 are shown pixilated, as image data corresponding to a digital image that a CCD or CMOS sensor may generate may appear, wherein the pixilation typically is a function of, for example, a resolution of the sensor that captured the scene, equipment and software that processes the image data, or a display device that may render the image data as an image for human viewing. In the figure, the line 0 indicates a reference location of a camera that captured the image of scene 2. First object 4 is a distance L from reference line 0, and second object 6 is a distance L from the first object, or a distance of 2 L from the camera at reference line 0. Equipment and software, which may be part of a computer vision system, that processes image data that represents scene 2 may generate outlines of objects in scene 2. Accordingly, an outline of first object 4 appears twice as large as the outline of object 6. In the figure, octagon shapes are used as objects 4 and 6, which may represent stop signs. Other object shapes represented in image data could be analyzed by computer equipment and software of a vision system to result in shape outlines other than octagons that correspond to the respective other object shapes. Object 10 is a rectangle in the image objects shown in the figure, and may represent an item, such as, for example, a box, an elevation view of a tire, a piece of wood or lumber, etc. Other shapes that might be analyzed could include a triangle (such as a yield sign) a rectangle (such as a speed limit sign), a circle (such as a RR crossing sign, or the circle of a light in a traffic light device, a square, such as a caution sign, a shield, such as an Interstate route number sign, as well as other shapes that may have standard features that may associated with them in a data store. Although this list of possible shapes is not exhaustive, the list is representative of shapes typically encountered along a roadway that have a standard shape and size, and that may also have a substantially standard color, or colors. In addition, the font type and size used for messages on street signs may be substantially standardized for a given message, such as "STOP", "YIELD", "CAUTION", route number, etc.

As shown in FIG. 2, the distance dimension between opposing vertices of the second object 6 octagon is shown as D, and the distance dimension between opposing vertices of the first object 4 octagon is shown as 2D. Because second object 6 is twice as far from the camera at reference line 0 than first object 4, assuming the two objects are substantially similar, dimensions of the outline of the first object, including the length of the post that supports the first object, appear twice as large as the corresponding dimensions of the outline of the second object. Not only do first object 4 and second object 6 appear as different sizes, the image data that represents the objects in a data file, or in a data store, typically will map to a number of pixels that correspond to the sizes and shapes of the objects. Likewise, after processing by a computer vision system, the outlines of objects 4 and 6 typically are mapped to numbers of pixels that correspond to the size and shape of the objects. For example, since both of first object 4 and second object 6 are octagons (i.e., stop signs), and the first object is twice as close to a camera at reference line 0 as is the second object, the number of pixels representing an edge/side of the first object will be approximately twice the number of pixels that represent the corresponding edge/side of the second object. (It will be appreciated that the number of pixels that map to a side of the outline of first object 4 may not be exactly twice as many map to a side of the outline of second object 6 due to resolution limitations of the image sensor that captures scene 2, or due to rounding during processing of the image data that represents scene 2.) Based on object features of the first object 4 or second object 6, object-defining information may be retrieved from a data store, such as a memory accessible by the camera or computer vision system that processed the image data of the scene, a smart phone memory that may be in communication with the camera or computer vision system, a remote server that may be in communication with the camera or computer vision system, or other data storage means accessible by the camera or computer vision system. The features used for looking up and retrieving the object-defining information may include object shape, object color, object text, object text font or font size, object message, object image (such as the shape of a jurisdiction icon that represents the type of roadway, such as state, county, nationality, province, etc.), object outline shape, number of pixels representing a given portion of the shape or shape outline, or other identifying features of object that may be standardized and that may be likely encountered along a roadway. Upon performing a lookup from the data store based on one or more of the object features, object-defining information may be retrieved from a data store for further processing as discussed in reference to other figures herein.

Figure 3:
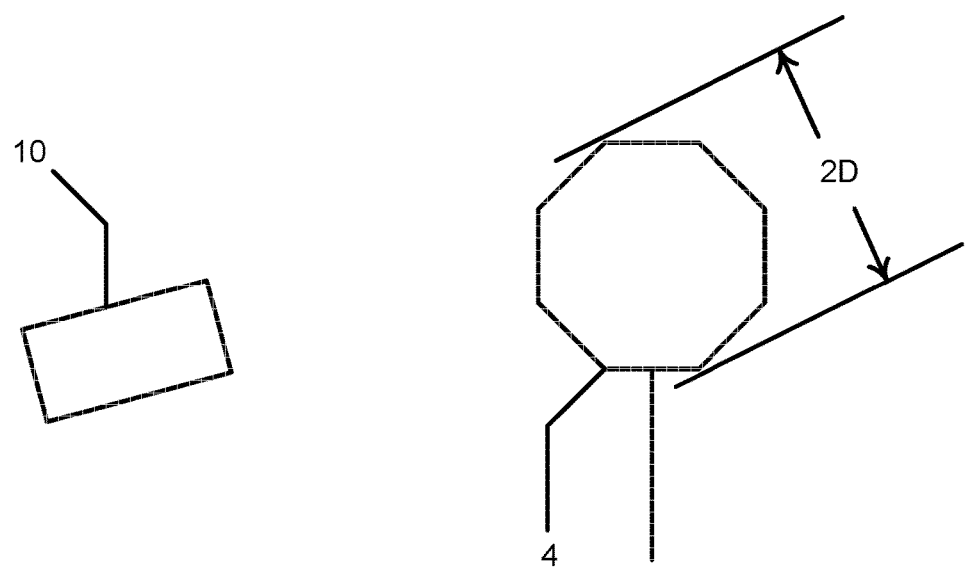
FIG. 3 illustrates enlarged objects in a digitized image of a scene of a roadway as viewed from the perspective of a camera associated with a vehicle traveling on a roadway that took the image.

Turning now to FIG. 3, the figure illustrates enlarged first object 4 and second object 6 from scene 2 in FIGS. 1 and 2. The enlarged versions of outlines of first object 4 and second object 6 show pixel details and that a digital image generated from image data captured by a camera at reference line 0 shown in FIGS. 1 and 2 comprises substantially twice as many pixels that define a segment of the outline of the first object than define the corresponding segment of the outline of the second object.

Figure 4:
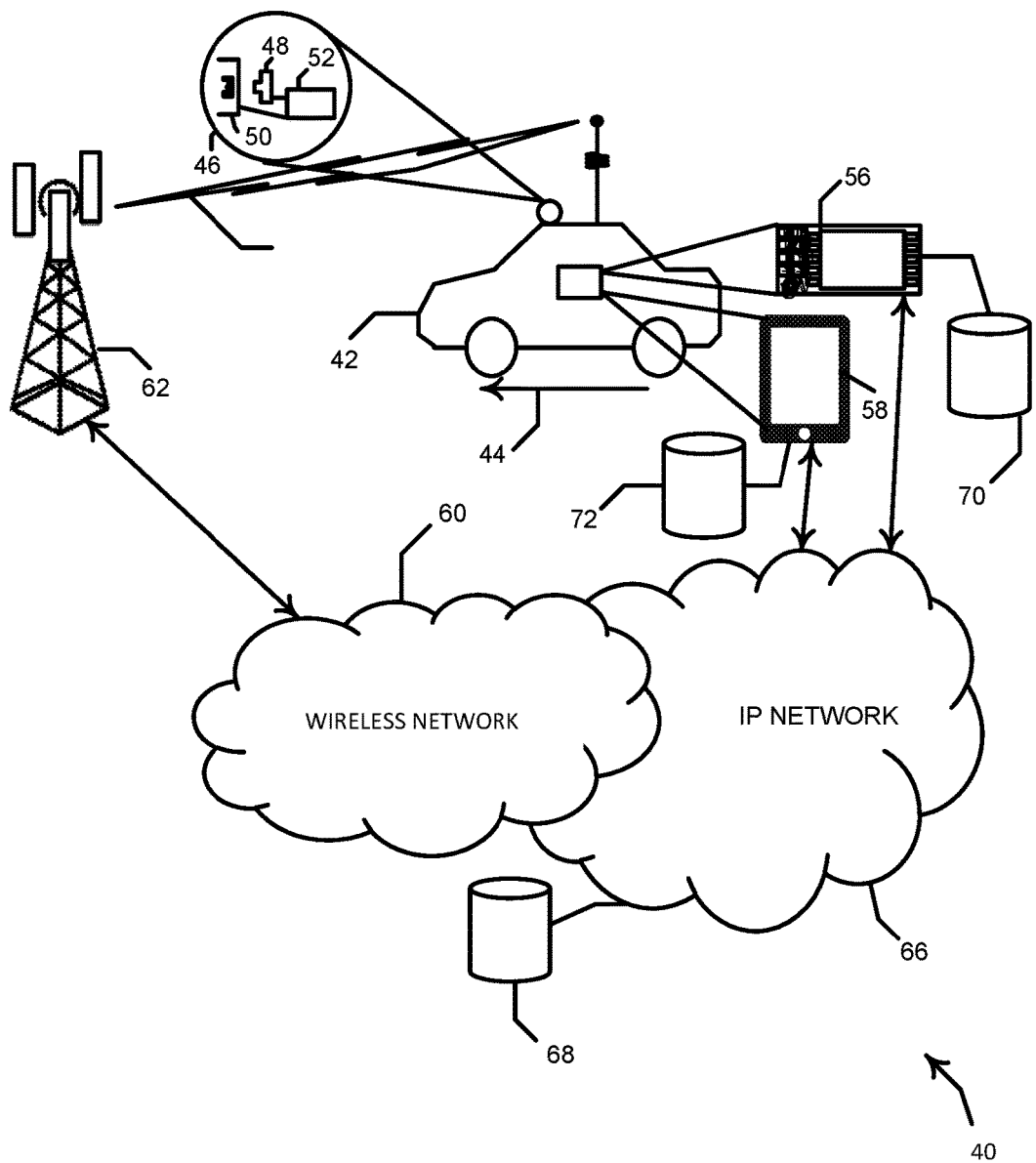
FIG. 4 illustrates a system for determining distance from a vehicle to an object.

Turning now to FIG. 4, the figure illustrates a system 40 that may be used by, or with, vehicle 42. Vehicle 42 may travel in direction 44, and may be the vehicle from which scene 2 is viewed in FIG. 1. Continuing with discussion of FIG. 4, vehicle 42 may include a sensor pod 46. Sensor pod 46 may be mounted externally to vehicle 42, such as mounted to the roof of the vehicle, to a side panel, to a trunk lid, behind a grill, to a front panel (for example in the nose of an electric vehicle that does not have a radiator opening), or any other mounting location that provides an unobstructed view of a scene relative to the vehicle. The scene relative to vehicle 2 that sensor pod 46 has a view toward may include a view forward of the vehicle, a view to the rear of the vehicle, a view above the vehicle, a view below the vehicle, or a view to the side of the vehicle. In FIG. 4, the sensor pod is shown such that it has a forward view of the vehicle.

Sensor pod 46 includes camera 48 and LIDAR system 50. Sensor pod 46 may include a processor 52 that can communicate with camera 48 and LIDAR system 50, and that may also communicate with a computer device, or processor thereof, of the vehicle. Vehicle device 54 may communicate with LIDAR system 50, which may provide distance information to the vehicle device. Examples of vehicle computer device 54 include a vehicle's electronic control module ("ECM"), a telematics device, an infotainment head unit 56, or a user's user device, such as smart phone 58. Vehicle computing device 54 may include wireless telephony components for connecting to wireless network 60, such as, for example, a GSM network, an LTE network, or other type of wireless telephony/data network, via wireless antenna 62 and via wireless link 64. By establishing a wireless connection to wireless network 60, vehicle device 54 may communicate with Internet Protocol ("IP") network 66 and devices in communication therewith, such as data store 68. Data store 68 may be a memory, a hard drive, a flash drive, a thumb drive, part of a server, or any computer device, or component thereof, capable of storing data and coupled to IP network 66. IP network may be the world wide web, another public IP network, or a private network such as may be operated by, or for, a telematics services provider, a vehicle manufacturer, a traffic information aggregator, a traffic management provider or server that remotely manages autonomous vehicles driving on a public or private road. In addition to having access to data store 68, vehicle device 54 may access a data store associated with vehicle 42, such as data store 70 that may be part of, or communicatively coupled via a vehicle communicate bus, such as a controller area network ("CAN") bus, with the vehicle computer device. If computer device 54 is a user's smart phone 58 or tablet, for example, data store 72 may be memory or storage on the user device.

In as aspect, processing and accessing of data is performed on, and retrieved from memory in a data store in, and coupled to, a communication bus of the vehicle to minimize lag in retrieving data from a data store and for performing processing for calculating distance to an object in an image.

However, processing or data store functionality may be performed on, or provided from, a processor or data store that is remote from the vehicle as wireless network access, communication, and cloud processing speeds improve. In an aspect, processing or data store functionality may be performed by a user device, such as a smart phone or tablet, or similar, that is in communication with a communication bus of the vehicle. In an aspect, image capture, processing, or data store functionality may be performed by a user device, such as a smart phone or tablet, or similar, that may be in, held within, attached to, or otherwise associated with, a vehicle and may not be communication with a communication bus of the vehicle, such that any of, or all of, processing, image capture, and data store access functionality is performed by the user device. As described in reference to FIG. 5, infra, the method illustrated by the flow diagram in FIG. 5 may be implemented by image devices, processing devices, or data store devices/equipment regardless of whether the image devices, processing devices, or data store devices/equipment are coupled to, associated with, or remote from the vehicle.

Turning now to FIG. 5, the figure illustrates a flow diagram of a method 500 for determining the distance of an object in an image from a camera that took the image based on features derived from digital image data that defines the image. Method 500 begins at step 505. At step 510, a processor receives image data, for example digital image data, that represents an image of a scene. The scene may include surroundings of a vehicle on a roadway, and may include the surroundings of the roadway ahead of the vehicle in a direction the vehicle is traveling on the roadway. The processor may be embodied in a computer device associated with a vehicle and coupled with, or in communication with, a camera that took, or captured, the image. The camera may be manufactured as part of, or as an aftermarket addition to, the vehicle. The camera may be part of a user device, such as a smart phone or table. The processor/computer device may be distinct from, or part of, the camera, or device that includes the camera. The processor/computer device may be distinct from, or part of, the camera and may have been be manufactured as part of, or as an aftermarket addition to, the vehicle. The camera may be part of a user device, such as a smart phone or tablet; the processor may be part of a user device, such as a smart phone or tablet. The processor may be communicatively coupled with a data store, such as a memory, a flash drive, a memory chip, a SIM card, a hard drive, a remote server, or other hardware means for a storing data to and retrieving data from. In addition, reference to a data store herein may include reference to a software implementation for managing the storing of data to and retrieving data from a hardware data store means.

Continuing with discussion of step 510, the processor that receives image data may receive image data from a camera, or may receive image data from a data store. In an aspect, the processor receives image data substantially in real time as the vehicle travels along a roadway. For example, a camera may be substantially fixed to the vehicle and may provide image data as it captures images of scenes surrounding the vehicle to the processor. Alternatively, the camera may be part of a user's user device that may be mounted to the vehicle, or hand-held by a user in the vehicle, to capture scenes surround the vehicle. The camera may periodically capture image data and provide the image data to the processor as a predetermined frame rate. The predetermined frame rate for providing frames of image data to the processor may be fast enough to be referred to as video image data. The predetermined frame rate may be variable, and the processor, or a processor in communication with a vehicle ECM, may vary the camera's frame rate according to the speed of the vehicle. For example, the processor that controls the camera's frame rate may instruct the camera to capture images at a higher rate when a vehicles is traveling at a given speed than an image rate it may request of the camera if the vehicle is traveling at a speed slower than the given speed. The processor may determine the speed of the vehicle from the vehicle CAN bus, or similar, which speed may be derived from data from sensors coupled to the CAN bus. In an aspect, the processor in communication with the camera that processes image data may also derive the speed of the vehicle from evaluation of image data as will be discussed infra in reference to step 555, and may call for an increased or reduced image frame rate as speed of the vehicle increases, or decreases, respectively.

At step 515, the processor, which may be the processor that is coupled to the camera and receives or controls the camera, or may be a different processor, for example a processor that is part of a vehicle infotainment system, a vehicle telematics system, a user device, or the vehicle's ECM, evaluates image data received at step 510 and determines whether the image data represents a scene that includes objects. The evaluation and determination at step 515 may be performed by a computer vision system that may include software running on the processor that performs the evaluation and determination step 515.

After determining that image data received at step 510 contains data representing one or more objects, the computer vision system determines features associated with each of the one or more objects at step 520 from the image data that represents the one or more objects. Examples of object features that may be determined at step 520 include: outline shape, outline segment dimension, object color, object markings, object contours, or other similar object features or characteristics. In an example, a computer vision system may identify a first object in an image as having an octagonal shape. Further, the computer vision system may identify the octagonal object as being elevated above the elevation of the roadway that the vehicle is traveling on, and may identify that a thin support may extend downwardly from the octagon shape to the elevation of the roadway that the vehicle is traveling on.

At step 525, the processor running the computer vision system may query a data store, which may, or may not be, the same data store as image data may be received from at step 510. In the query at step 525, the processor may request a lookup of object-defining information that may correspond to one or more object features, or characteristics, determined at step 520 for an object determined at step 515. For example, the query at step 525 may include feature information that the first object is an octagon. The data store receiving the query may process the query and perform a table lookup, or other similar search, of pre-stored object-defining information. If multiple objects are determined at step 515 to exist in the image, the query at step 525 may generate a first query based on a query priority criterion, or based on query priority criteria. For example, if multiple objects are determined at step 515, a query at step 525 may be based on features determined for an object that has an outline that encompasses more pixels than any other object determined at step 515. If subsequent queries are generated at subsequent iterations of step 525 following performance of step 560 as discussed infra, the processor may base each successive query on an object outline encompassing the next highest number of pixels in the image. Or, a query priority criterion may be shape simplicity. For example, if multiple objects are determined at step 515, the processor that generates a query may first generate a query at step 525 based on an object having a rectangular shape outline instead of an octagon or other shape outline, and if the processor performs subsequent iterations of step 525, the next simplest shape outline may be used as a basis for the next query, regardless of size, or including size as a query priority criteria. Other query priority criterion, or criteria, may include the location of an object in an image. For example, if multiple objects are determined at step 515, a processor that generates a query may 'scan' the image in a horizontal and vertical fashion (e.g., pixels from an upper left corner to a lower right corner scanning along each row of pixels from left to right and from the top row to the bottom row, or another order), and prioritize objects for generating queries according to an order the processor encounters pixels of objects as it 'scans' or processes the objects in the image at step 515.

The pre-stored object-defining information may be a roadway-object database that may include object-defining information related to objects typically encountered along a roadway. For example, a vehicle traversing a roadway typically encounters stop signs, yield signs, speed limit signs, route marker signs, cross walk lines painted on the roadway, stop lines painted on the roadway, reflectors attached to the roadway to aid in night time guidance of the vehicle, advertising billboards, traffic lights, etc., and other objects that are known to have standard features. These standard roadway objects are typically standardized with respect to size, shape, image thereon (i.e., border lines, text font, icon, etc.), and with respect to placement relative to the roadway (i.e., distance from the edge of the roadway for sign support placement, distance above the roadway for traffic lights, reflectors attached to the center of the roadway a predetermined distance apart from one another, etc.). In an aspect, dedicated objects, such as signs, posts, images on guardrails, and the like may be specially designed and specifically placed relative to the roadway to facilitate capturing in image data by a camera for processing by a processor that receives the image data. For example, signs (objects) may be placed on guardrails a predetermined distance apart. The signs/objects placed on the guardrails may be of a predetermined, standardized, size and shape. The signs/objects placed on the guardrails may have a predetermined reference shape of a predetermined reference size. The signs/objects placed on guardrails may include textual information, or may comprise a barcode, QR code, or similar means for encoding information for reading by a computer vision system. The signs/objects placed on guardrails may be visible to a human eye. The signs/objects placed on guardrails may be small enough to be visually negligible to human vision, especially to a human from a distance that a driver of a vehicle proximate the guardrail would be, but nevertheless visible to a camera with a high enough resolution and focal length to discern details, features, and characteristics of the object in an image thereof. Aspects of signs/objects of standard size and shape have been discussed in reference to placement on guardrails, but could also be placed on message portions of pedestals, signs on posts, signs hanging from structures, signs on billboards, and may be visible to human drivers operating, or riding in, a vehicle traveling on a roadway, or may be visually negligible to a human traveling in a car along a road. Information associated with the standardized features and characteristics of objects may be stored in a data store and retrievable based on the standardized features and characteristics.

A computer vision system may decompose an object into various features, such as color, outline, outline shape, outline size, color gradient, etc. For example, if a computer vision system associated with a vehicle determines that an object that the vehicle encounters along the roadway has an octagonal outline shape, it may decompose the image into the following features: outline shape=octagon, main color=red, secondary color=white (or, light intensity may be used instead of color), text=yes, text word="STOP", etc. In addition, the information determined by the computer vision system may include a number of pixels in the image data used to represent a segment of the octagon. The number of pixels would typically not be used in a query of the data store for object information.

In the scenario where the first object processed by the processor is a stop sign, the feature information of outline shape and main color may be used to look up information in the data store associated with an object having an octagonal shape and having a primary color of red. At step 530, the data store may determine that it includes a data record for an object having the features, or characteristics of a red octagon and proceed to step 535. At step 535, the data store retrieves from the data store, and forwards to the querying processor, object-defining information from a data record that is associated with an octagonal outline shape having a primary color of red. The object-defining information may include, for example, a dimension of one of the sides of the octagon. Or, the object-defining information may include a dimension across the octagon from one vertex to an opposing vertex (i.e., the longest distance between two vertices of the octagon as shown as dimension D in FIG. 1).

The querying processor receives the object-defining information from the data store and calculates the distance to the first-object octagon based on the received object-defining information and based on image data that may include number of pixels in the image data from which the object features that were sent in the query were derived, camera/ lens focal length, sensor size and sensor resolution, and the like. For example, a standard stop sign in The United States is thirty inches from one vertex to its opposing vertex. A camera in the vehicle that captures the image may have a sensor size of 2"×3" and a corresponding sensor resolution of 2000×3000 pixels. The camera's lens system may have a focal length of 35 millimeters. The processor that has received the object-defining information from the data store has the object defining information that the dimension across the red octagon shape is 30" and the dimension of one of the eight sides of the octagon outline is approximately 11". Other image-defining information may include the perpendicular dimension from one edge of the octagonal outline to the parallel edge of the octagon as being approximately 27.911". Assuming that the camera sensor's 3-inch dimension is parallel to a top edge, and opposing bottom edge, of the octagon object, if a vertical column of pixels represented by the image data corresponding to a vertical edge of the red octagonal image comprises 20 pixels (i.e., $\frac{1}{100}$ of the sensor's vertical resolution), the object was (5.5"×35)mm)/tan (0.4185°, or 63 feet away when the camera captured the image of the stop sign. The angle of 0.4185° is determined assuming the image sensor is located from a lens having equal back curvature $R_2$ and front curvature $R_1$ radiuses, and that the lens is focused at co (i.e., the sensor is 35 mm behind a lens that focuses light from distant objects in front of the lens onto the sensor). In essence, sensor pixel resolution and sensor size, lens focal length, and object-defining information corresponding to the determined object in the image (in this example, the known dimension of the length of an edge of a standard stop sign) are used to convert the size of an object in an image captured by a sensor into distance to the object from the camera. For a single lens camera having a symmetrical lens with $R_1=R_2$ focused at co, and for a camera having such a lens system, for purposes of illustrative calculations herein, reference to 'the camera' typically means the center of the lens along its axis. The focal length f acts as a conversion factor in this example because when focused at co, the sensor is 35 mm from one side of the lens and the object in the distance reflecting light toward the lens is at the unknown distance. The object size at the sensor, or in the image, divided by the distance from the sensor to the lens, which is 35 mm in the example, equals the actual object size divided by the distance to the object from the lens as shown below in eqs. 1 and 2.

Sensor object size÷$f$=actual object size÷distance to object                                               Eq. 1

Therefore;

Distance to object=Actual object size×$f$/sensor object size.                                           Eq. 2

For the image objects in the example shown in FIGS. 1 and 2, and enlarged in FIG. 3, a vertical edge of the outline of first object 4 is eight pixels. A corresponding vertical edge of second object 6 is four pixels. Assume a sensor size of 2" vertical×3" horizontal, with a corresponding resolution of 2000 pixels vertical and 3000 pixels horizontal. Thus, at the time the image of scene 2 was captured by a camera having a 35 mm focal length lens associated with a vehicle traveling along roadway 8, the first object is ((11"×25.4 mm/in×35 mm)/(8 pixels×2 in/2000 pixels×25.4 mm/in))×(1 in/25.4 mm)×1 ft/12 in, or 158 feet away from the camera. Similarly, the camera was 316 feet away from second object 6 when the image of scene 2 was captured by a camera.

After calculating the distance to objects represented in image data, method 400 advances to step 545 to determine if other images taken within a predetermine period (e.g., the reciprocal of a predetermined frame rate) exist. If another image, for purposes of discussion a second image taken of the same scene, taken within a predetermine period of the first image (which may have been taken before the second image or may have been taken after the second image) has been captured, a calculation of the distance to one or more objects in the second image is determined at step 555 similar to the determination made at step 535. The difference in distance to the same object in the first and second images is determined and divided by the time between when the first and second image are determined to determine a speed of the vehicle during the time between the taking of the first and second images. In addition, if a third image is taken within a predetermined period (e.g., a reciprocal of a predetermined frame rate), an acceleration of the vehicle associated with the camera that captured the first, second, and third images may be determined based on a change in speed determined from the taking of the first and second images, and a change in speed between the taking of the second and third images. If no images taken within a predetermined period of the taking of a first image exist in a memory coupled to, or in communication with, a camera associated with the vehicle, method 400 ends at step 550.

Returning to the description of step 530, if the data store does not respond to the query of step 525 with object-defining information associated with object features included in the query, the processor that is processing the image data or generating queries (image processing and query generating may, or may not, be performed by the same processor) may determine at step 560 if other objects are defined by the image data. If so, method 400 returns to step 515 and performs steps 515, 520, 525, and 530. If the processor that is processing the image data determines at step 560 that no other objects are defined by the image data, method 400 ends at step 550. It will be appreciated that although FIG. 5 shows flow returning to step 515 from the 'Y' path of step 560, program flow may return along the 'Y' path from step 560 to steps 520 or 525 depending on system design, the device, or devices, that include the processor, or processors, that perform the steps 515, 520, 525, and other steps shown in the figure. For example, a processor that performs computer vision/image recognition processing of an image at steps 515 or 520 may be different from a processor that performs the query/queries at step 525. In an example, a camera and computer vision system may be substantially fixed to a vehicle, but a user's smart phone in communication with the computer vision system may perform the generating of the query/queries at step 525. Or, a computer device that is substantially fixed to a vehicle may perform image recognition and processing, query generation, data step look up operations, and distance calculation operations.

In an aspect, distance to other objects may be determined if they are determined to be proximate to an object of known size. For an automotive example, if a known object such as a stop sign is in the camera's field of view and there are vehicles nearby, the distance to the vehicles can be estimated. Proximity of a vehicle, or other object in an image, to a known object of standard size or shape, such as a stop sign, may be determined to be nearby the known, standard object by evaluating physical clue objects such as: roadway markings, such as crosswalk lines, that align up with the vehicle and the sign; roadway edges or curbs that align with the vehicle and the sign/known object; a shadow that crosses the vehicle and sign to align them, sun angle information, camera orientation angle information relative to the known object (sun and camera information may be referred to as clue information rather than as clue objects) and a shadow from the sign itself that is cast onto the vehicle, a line of vehicles that clearly places the vehicle being evaluated next to the sign, as opposed to several vehicles away, etc. For example, a processor analyzing image data of an image that includes a stop sign, to which the distance has been determined as described herein, may determine that the front of a vehicle is stopped at the line of a crosswalk, or other associate object that is associated with the known/standard object, because the nose of the vehicle blots out part of crosswalk in the image. In an aspect, the processor may also determine that the rear of the vehicle is approximately the length of the vehicle closer to the camera that captured the image than the stop sign is, wherein the length of the vehicle is approximated based on the type of vehicle, which approximation determination may be based on computer vision/image recognition techniques or on consultation with information in a vehicle data store, which may include information describing aspects of vehicles based on vehicle type as may be recognized by a computer vision. The processor may also obtain and process sun angle information and current vehicle heading and calculate the distance to an unknown object in an image based on a shadow cast by an known object onto the unknown object that may not have object-defining information corresponding to it in the data store, based on an angle the shadow makes on the unknown object, wherein the known object has features and object-defining information associated with it in a data store and to which known object the distance has been determined as described herein. By using this proximity method the distance to any object in a camera's field of view can be estimated based on it closeness to the object of known size.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents. Any lens/camera configuration, focal length, and mathematics described above are given for purposes of illustrating the use of known object defining information (e.g., an object dimension) to determine an unknown distance to an object, and are not meant to limit the scope of the claims more than the words of the claims. Disclosure of particular hardware is given for purposes of example. In addition to the recitation above in reference to the figures that particular steps may be performed in alternative orders, as a general matter steps recited in the method claims below may be performed in a different order than presented in the claims and still be with the scope of the recited claims.

What is claims is:

1. A method, comprising:
   receiving with a computer device first image data representing a first image of a scene captured with a camera;
   processing, with a processor of the computer device, the first image data to determine one or more objects in the scene captured by the camera;
   determining from the first image data one or more object features associated with a first object of the one or more objects;
   retrieving object-defining information associated with the first object from a data store based on the one or more first object features associated with the first object;
   calculating the distance from the camera that captured the scene to the first object in the scene based on the first object-defining information;
   analyzing clue information and clue objects proximate the first object in the image to provide clues that a second object is proximate the first object; and
   wherein the clue information includes current sun angle information and current orientation of the camera relative to the second object, and wherein an angle of a shadow captured in the image cast by the first object onto the second object is a clue object.

2. The method of claim 1 wherein the one or more first object features associated with the first object is an outline shape of the first object.

3. The method of claim 1 wherein the retrieved object-defining information associated with the first object is a dimension associated with the first object.

4. The method of claim 3 wherein the calculating distance from the camera that captured the scene to the first object in the scene based on the object-defining information includes: determining a number of pixels in the first image that corresponds to the dimension associated with the first object, calculating, based on the number of pixels, a known focal length of the camera, and the retrieved dimension associated with the first object, the distance to the first object from the camera that captured the image.

5. The method of claim 4, further comprising:
   capturing a second image of the scene, wherein in the camera is associated with a moving vehicle, and wherein the scene is a scene of a roadway upon which the vehicle is traveling, and wherein the second image is captured in a second frame at a time that is a predetermined time from a time of a first frame that corresponds to the capturing of the first image;
   calculating a distance from the camera to first object in the second image; and
   determining a speed of the vehicle based on a change of distance between the camera to the first object in the first image and distance between the camera to the first object in the second image and the time between the capturing of the first image and the capturing of the second image.

6. The method of claim 4 further comprising calibrating a complex vision system based on the calculated distance from the camera that captured the scene to the first object in the scene based on the object-defining information associated with the first object.

7. The method of claim 4 further comprising calculating a distance to the second object in the first image based on the calculated distance to the first object.

8. The method of claim 7 wherein the first object and the second object are not similar.

9. The method of claim 7 wherein the first object and the second object are road signs.

10. The method of claim 4 wherein objects proximate the first object in the first image are analyzed to provide clues that the second object is proximate the first object, wherein object-defining information is not associated with the second object in the data store.

11. A computer device comprising:
    a processor to:
    receive first image data representing a first image of a scene captured with a camera;
    process the first image data to determine one or more objects in the scene captured by the camera;

determine from the first image data one or more object features associated with a first object of the one or more objects;

retrieve object-defining information associated with the first object, from a data store in communication with the processor, based on the one or more object features associated with the first object;

calculate the distance from the camera that captured the scene to the first object in the scene based on the object-defining information;

analyze clue information and clue objects proximate the first object in the image to provide clues that a second object is proximate the first object; and wherein the clue information includes current sun angle information and current orientation of the camera relative to the second object, and wherein an angle of a shadow captured in the image cast by the first object onto the second object is a clue object.

12. The computer device of claim 11 wherein the processor calculates the distance from the camera that captured the scene to the first object in the scene based on the object-defining information by determining a number of pixels in the first image that corresponds to the dimension associated with the first object, and calculating, based on the number of pixels, a known focal length of the camera, and the retrieved object-defining information associated with the first object, the distance to the first object from the camera that captured the image.

13. The computer device of claim 12, wherein the processor is further to:

receive second image data representing a second image of the scene, wherein the camera is associated with a moving vehicle, and wherein the scene is a scene of a roadway upon which the vehicle is traveling, and wherein the second image is captured at a time that is a predetermined time from a time of the capturing of the first image;

calculate a distance from the camera to the first object in the second image; and determine a speed of the vehicle based on a change of distance between the camera to the first object in the first image and distance between the camera to the first object in the second image and the time between the capturing of the first image and the capturing of the second image.

14. The computer device of claim 12 wherein the processor is further to: calibrate a complex vision system that determines distance to objects, wherein the processor calibrates the complex vision system at least based on the calculated distance from the camera that captured the scene to the first object in the scene based on the object-defining information associated with the first object.

15. The computer device of claim 12 wherein the processor is further to: calculate a distance to a third object in the first image based on the calculated distance to the first object, wherein both first and third objects have known dimensions.

16. The computer device of claim 11 wherein the computer device is a smart phone that comprises the camera and the data store.

17. The computer device of claim 11 wherein the computer device is a smart phone that receives image data from a camera, wherein the smart phone does not comprise the camera.

18. A method, comprising:

receiving with a computer device image data representing an image of a scene captured with a camera;

processing, with a processor of the computer device, the image data to determine one or more objects in the scene captured by the camera;

determining from the image data one or more object features associated with a first object of the one or more objects;

retrieving object-defining information associated with the first object from a data store based on the one or more object features associated with the first object;

calculating the distance from the camera that captured the scene to the first object in the scene based on the object-defining information;

analyzing clue information and clue objects proximate the first object in the image to provide clues that a second object is proximate the first object, wherein object-defining information is not associated with the second object in the data store; and wherein the clue information includes current sun angle information and current orientation of the camera relative to the second object, and wherein an angle of a shadow captured in the image cast by the first object onto the second object is a clue object.

19. The method of claim 18 wherein the clues include the second object blotting an associated clue object in the image at a location that appears in the image of the scene to correspond to the location of the first object.

20. The computer device of claim 18 wherein the computer device is a smart phone that receives image data from a camera, wherein the smart phone does not comprise the camera.

* * * * *